(12) United States Patent
Caputo et al.

(10) Patent No.: US 7,177,406 B2
(45) Date of Patent: Feb. 13, 2007

(54) SYSTEMS AND METHODS FOR PROVIDING PORTABLE VOICEMAIL SERVICES

(75) Inventors: Edward J. Caputo, Fairfax, VA (US); Scott O. Sherman, Solon, IA (US); Steven C. Johnson, Bethesda, MD (US)

(73) Assignee: MCI, LLC, Basking Ridge, NJ (US)

( * ) Notice: Subject to any disclaimer, the term of this patent is extended or adjusted under 35 U.S.C. 154(b) by 0 days.

(21) Appl. No.: 10/991,516

(22) Filed: Nov. 19, 2004

(65) Prior Publication Data

US 2005/0111632 A1    May 26, 2005

Related U.S. Application Data

(60) Provisional application No. 60/523,690, filed on Nov. 21, 2003.

(51) Int. Cl.
*H04M 1/64* (2006.01)
(52) U.S. Cl. .............................. 379/88.18; 379/88.16; 379/221.01
(58) Field of Classification Search ............. 379/88.16, 379/88.18, 88.22, 88.11, 211.02
See application file for complete search history.

(56) References Cited

U.S. PATENT DOCUMENTS

| | | | | |
|---|---|---|---|---|
| 4,897,870 A | * | 1/1990 | Golden ................. | 379/144.01 |
| 5,274,696 A | * | 12/1993 | Perelman ............... | 379/88.19 |
| 5,572,578 A | * | 11/1996 | Lin et al. ............... | 379/88.18 |
| 5,680,442 A | * | 10/1997 | Bartholomew et al. .. | 379/88.26 |
| 5,687,220 A | * | 11/1997 | Finnigan ............... | 379/88.22 |
| 5,812,639 A | * | 9/1998 | Bartholomew et al. ..... | 370/352 |
| 6,002,751 A | * | 12/1999 | Shaffer .................... | 379/88.18 |
| 6,243,832 B1 | * | 6/2001 | Eckes et al. ............... | 714/33 |
| 6,396,908 B1 | * | 5/2002 | O'Donovan et al. ..... | 379/88.18 |
| 6,396,909 B1 | * | 5/2002 | Reksten et al. .......... | 379/88.18 |
| 6,577,712 B2 | * | 6/2003 | Larsson et al. .......... | 379/88.17 |
| 6,628,761 B1 | * | 9/2003 | Adamczyk et al. ....... | 379/88.19 |
| 6,650,737 B2 | * | 11/2003 | Finnigan .................. | 379/88.02 |
| 6,690,785 B1 | * | 2/2004 | Stelter et al. .......... | 379/211.02 |
| 6,741,677 B2 | * | 5/2004 | Reformato et al. ...... | 379/88.01 |
| 6,823,047 B1 | * | 11/2004 | Cruickshank ............ | 379/88.18 |
| 6,882,708 B1 | * | 4/2005 | Bedingfield et al. ..... | 379/88.18 |
| 2005/0053223 A1 | * | 3/2005 | Bedingfield ............... | 379/230 |

* cited by examiner

*Primary Examiner*—Ovidio Escalante (57) ABSTRACT

A system for providing voicemail services includes a network device that receives voicemail messages intended for subscribers. The subscribers may be associated with a number of different local telephone service providers. The network device also stores the voicemail messages for later retrieval by the subscribers.

22 Claims, 8 Drawing Sheets

| SUBSCRIBER ID 310 | OTHER 320 |
|---|---|
| 5551234567 | |
| 5559876543 | |
| ... | |

SYSTEMS AND METHODS FOR PROVIDING PORTABLE VOICEMAIL SERVICES

RELATED APPLICATION

This application claims priority under 35 U.S.C. § 119 based on U.S. Provisional Application No. 60/523,690, filed Nov. 21, 2003, the disclosure of which is hereby incorporated by reference herein.

FIELD OF THE INVENTION

Implementations consistent with the invention relate generally to communication services and, more particularly, to voice messaging services.

BACKGROUND OF THE INVENTION

Conventional voicemail systems receive, store and provide voicemail messages for subscribers of the voicemail system. A "subscriber" is typically a person that has a relationship with the provider of the voicemail system. For example, the voicemail service may be provided by the local telephone company through which the subscriber receives local telephone service. In this case, the subscriber may pay for the voicemail service directly or indirectly through the purchase of other services, such as local phone service.

A problem with conventional voicemail systems occurs when a subscriber wishes to change service providers. For example, when a subscriber wishes to change local service providers, the subscriber must cancel local phone service with a first provider and sign up for local phone service with a second provider. When this occurs, the subscriber's voicemail service is automatically cancelled as well.

When the voicemail service is cancelled, any saved voicemail messages are typically lost. In addition, registering for a new voicemail service is often a cumbersome process that may include setting up a voice mailbox, designating certain telephone numbers for call forwarding, etc.

SUMMARY OF THE INVENTION

According to one aspect of the invention, a method for providing voicemail services is provided. The method includes receiving a call forwarded from a first local exchange carrier associated with a called party via a long distance network, where the call is from a calling party and intended for the called party. The method also includes providing a prompt to the calling party and storing a voicemail message from the calling party.

According to another aspect of the invention, at least one network device is provided. The network device is configured to receive a call forwarded from a first local exchange carrier, where the network device is not affiliated with the first local exchange carrier. The call is from a calling party and intended for a called party. The network device is also configured to provide a message to the calling party instructing the calling party to leave a voice message and receive a voice message from the calling party. The network device is further configured to store the voice message.

A further aspect of the invention provides a system that includes at least one network device. The network device is configured to receive voicemail messages intended for subscribers, where the subscribers are associated with a number of different local telephone service providers. The network device is also configured to store the voicemail messages.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Exemplary System

Figure 1:
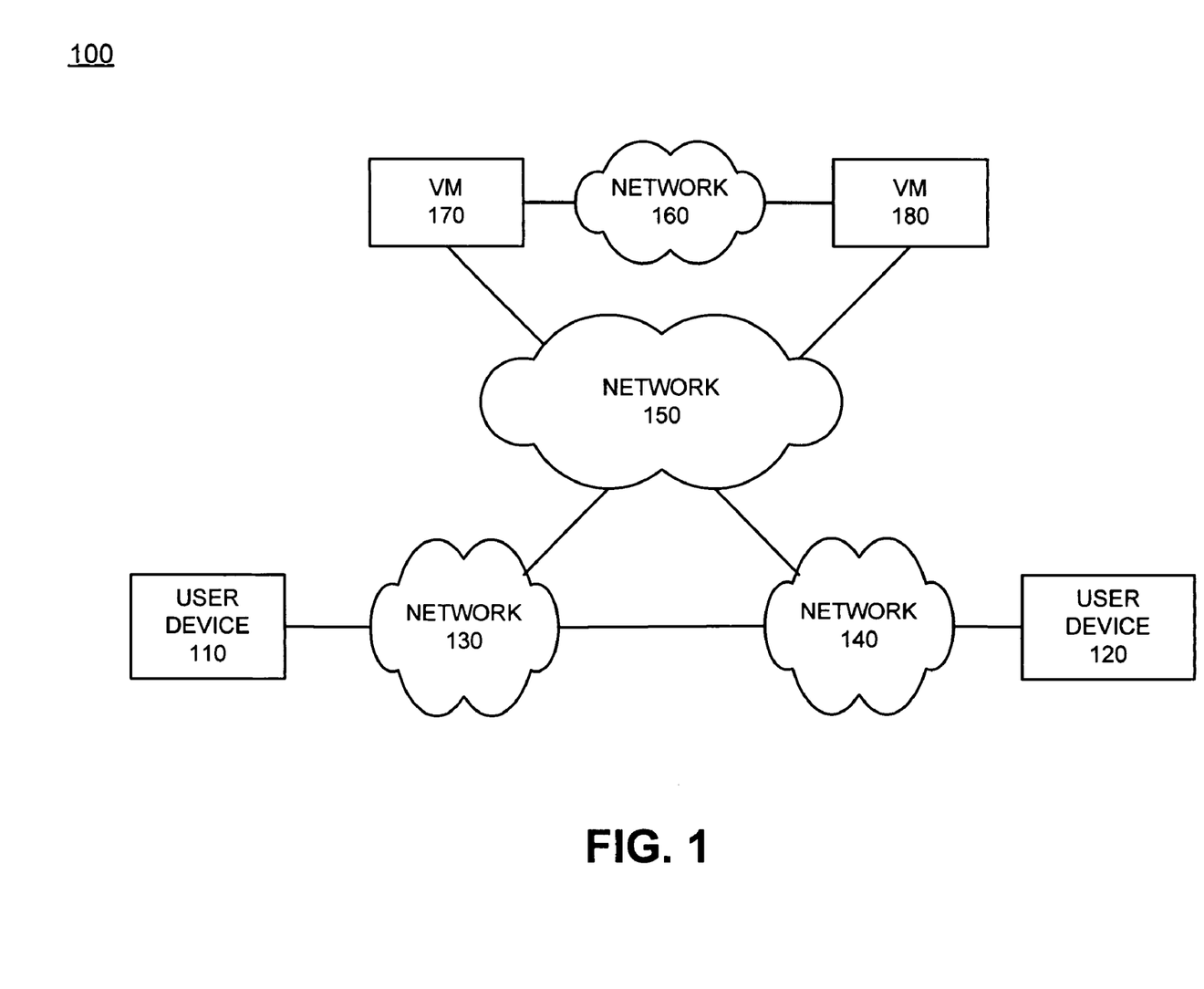
FIG. 1 illustrates an exemplary system in which methods and systems consistent with the invention may be implemented.

FIG. 1 illustrates an exemplary system in which methods and systems consistent with the invention may be implemented. Referring to FIG. 1, system 100 may include user devices 110 and 120, networks 130, 140, 150 and 160 and voicemail devices (VM) 170 and 180. The number of devices and networks illustrated in FIG. 1 is provided for simplicity. In practice, a typical system could include more or fewer devices and networks than illustrated in FIG. 1.

User devices 110 and 120 may each include any device capable of transmitting voice signals to a network, such as networks 130 and 140. In one implementation, user devices 110 and 120 may include any type of telephone system/device, such as a plain old telephone system (POTS) telephone, a session initiation protocol (SIP) telephone, a wireless telephone device (e.g., a Personal Communications System (PCS) terminal that may combine a cellular radiotelephone with data processing, facsimile, and data communications capabilities, a Personal Digital Assistant (PDA) that can include a radiotelephone, a pager, an Internet/intranet access, a Web browser, an organizer, a calendar, and/or a global positioning system (GPS), or the like), etc. In another implementation, user devices 110 and 120 may include a type of computer system, such as a mainframe, minicomputer, personal computer, a laptop, or the like. User devices 110 and 120 may connect to networks 130 and 140, respectively, via any conventional technique, such as wired, wireless, or optical connections.

Networks 130, 140, 150 and 160 may include a local area network (LAN), a wide area network (WAN), a telephone network, such as the Public Switched Telephone Network (PSTN), an intranet, the Internet or a combination of networks. In one implementation consistent with the invention, networks 130 and 140 may include a PSTN, network 150 may include a long distance telephone network and network 160 may include a WAN. In this implementation, networks 130 and 140 may each include one or more end offices, central offices (COs) and associated switches. Networks 130 and 140 may also include one or more tandem switches, such as a Class 4 switch that may act as a point of presence for interfacing to a long distance network (e.g., network 150), etc. Networks 130 and 140, consistent with the invention, may also represent networks associated with different local exchange carriers (LECs) that provide local phone service to subscribers in a particular area.

Network 150, consistent with the invention, may represent a long distance network to which networks 130 and 140 may connect via, for example, tandem switches, to route long distance telephone calls. Network 160 may include a WAN that connects VM devices 170 and 180.

VM devices 170 and 180 may each include one or more network devices (e.g., voicemail servers/platforms) that perform voicemail services, such as receiving, storing, and providing voicemail messages. For example, VM devices 170 and 180 may each include an automated response unit (ARU) and automatic call distributor (ACD) that provides a greeting to a caller and prompts the caller to leave a message. One or more bridging switches (not shown) may also be coupled to each of VM devices 170 and 180 to route the calls to the appropriate VM device and to protect against failure in any one of the bridging switches and/or lines connected to the bridging switches.

In one implementation, VM devices 170 and 180 may be associated with subscribers or subscriber loops with which the subscribers are associated. VM devices 170 and 180 may communicate with each other via network 160 and may connect to network 160 via wired, wireless, or optical connections.

Figure 2:
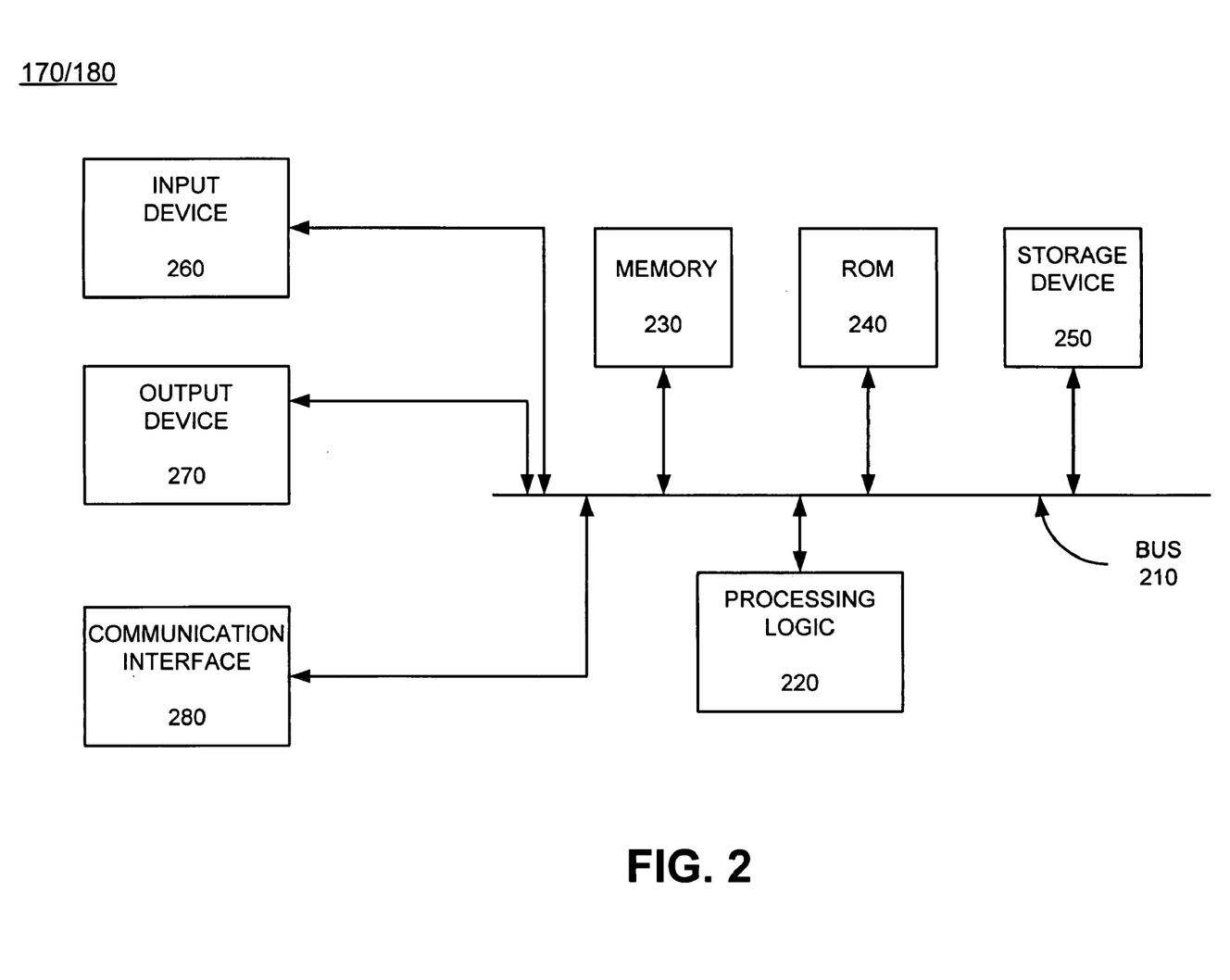
FIG. 2 illustrates an exemplary configuration of the voicemail devices of FIG. 1 in an implementation consistent with the invention.

FIG. 2 illustrates an exemplary configuration of a VM device 170 or 180 in an implementation consistent with the invention. Referring to FIG. 2, VM device 170/180 may include a bus 210, processing logic 220, a memory 230, a read only memory (ROM) 240, a storage device 250, an input device 260, an output device 270, and a communications interface 280. It will be appreciated that VM device 170/180 may include other components (not shown) that aid in receiving, transmitting, and/or processing voicemail messages.

Bus 210 may permit communication among the components of VM device 170/180. Processing logic 220 may include any type of conventional processor or microprocessor that interprets and executes instructions. In other implementations, processing logic 220 may be implemented as or include an application specific integrated circuit (ASIC), field programmable gate array (FPGA), or the like. Memory 230 may include a random access memory (RAM) or another type of dynamic storage device that stores information and instructions for execution by processing logic 220. ROM may include a conventional ROM device and/or another type of static storage device that stores static information and instructions for processing logic 220. Storage device 250 may include some other type of magnetic or optical recording medium and its corresponding drive for storing information and/or instructions.

Input device 260 may include a conventional device that permits an operator to input information to VM device 170/180, such as a keyboard, a keypad, a mouse, a pen, a microphone, one or more biometric mechanisms, and the like. Output device 270 may include a conventional device that outputs information to the operator, including a display, a printer, a speaker, etc.

Communication interface 280 may include any transceiver-like mechanism that enables VM device 170/180 to communicate with other devices and/or systems. For example, communication interface 280 may include mechanisms for communicating with another device or system via a network, such as network 150 or 160.

VM device 170/180, consistent with the invention, may perform voicemail services, as described in detail below. VM device 170/180 may perform these and other services in response to processing logic 220 executing software instructions contained in a computer-readable medium, such as memory 230. A computer-readable medium may be defined as one or more memory devices and/or carrier waves. The software instructions may be read into memory 230 from another computer-readable medium, such as data storage device 250, or from another device via communication interface 280. The software instructions contained in memory 230 may cause processing logic 220 to perform processes that will be described later. Alternatively, hardwired circuitry may be used in place of or in combination with software instructions to implement processes consistent with the principles of the invention. Thus, systems and methods consistent with the invention are not limited to any specific combination of hardware circuitry and software.

Figure 3:
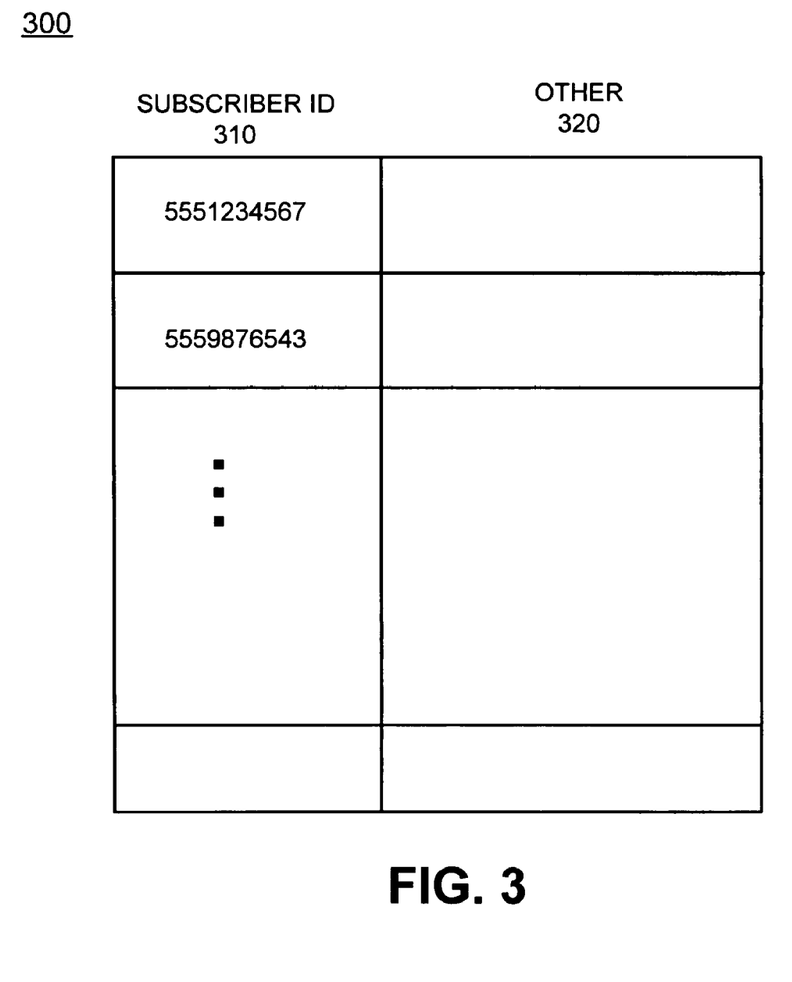
FIG. 3 illustrates an exemplary database that may be associated with the voicemail devices of FIG. 1 in an implementation consistent with the invention.

FIG. 3 illustrates an exemplary database 300 that may be associated with VM device 170 and/or 180 in an exemplary implementation consistent with the invention. Database 300 may be stored in, for example, storage device 250 (FIG. 2) or may be located externally from VM devices 170/180. While only one database is described below, it will be appreciated that database 300 may consist of multiple databases stored locally at VM device 170 or 180 or stored at different locations accessible via network 160. Moreover, each VM device 170/180 may be associated with a separate database 300 or database 300 may be associated with both of VM devices 170 and 180. In other implementations consistent with the invention, database 300 may be associated with one or more other devices in system 100. For example, database 300 may be associated with a switch (or other network device) included within network 130 or 140.

Referring to FIG. 3, database 300 may include a subscriber identification (ID) field 310 and other field 320. Subscriber ID field 310 may store an identifier that uniquely identifies a subscriber device, such as one of user devices 110 or 120. The identifier may include, for example, a unique group of characters. In an exemplary implementation, the identifier may include a telephone number that is associated with a subscriber device. Other field 320 may store information associated with the subscriber, such as advanced voicemail options. For example, advanced call forwarding options may be stored in other field 320. It should be understood that database 300 may contain additional fields (not shown) that aid VM device 170/180 in providing voicemail services.

Exemplary Processing

Figure 4:
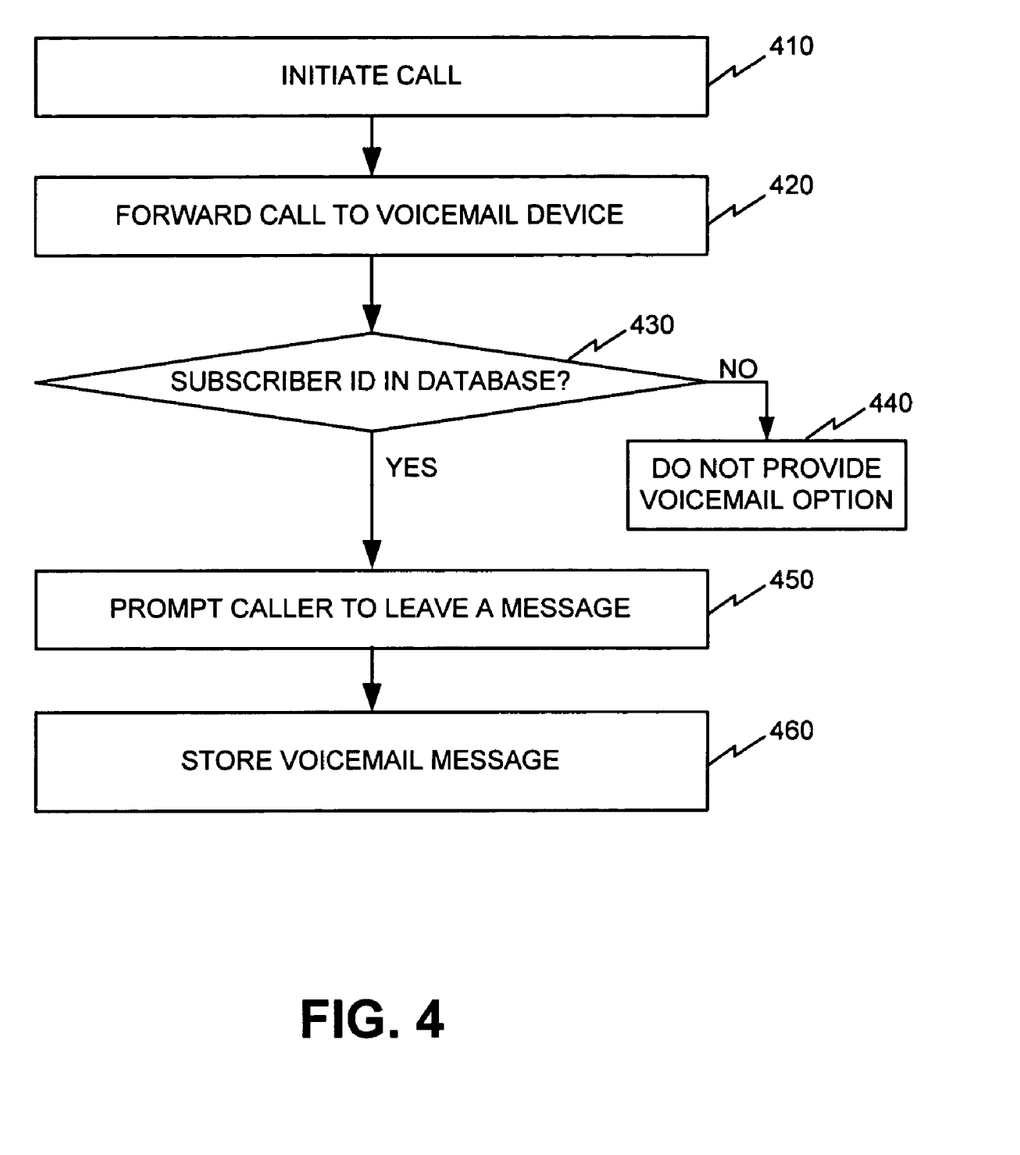
FIG. 4 illustrates an exemplary process for receiving and storing voicemail messages in an implementation consistent with the invention.

FIG. 4 illustrates an exemplary process for receiving and storing voicemail messages in an implementation consistent with the invention. Processing may begin with a calling party at a user device, such as user device 110, initiating a call to a party (referred to as the "called party") at, for example, user device 120 (act 410). The calling party may initiate the call by, for example, dialing a telephone number associated with user device 120.

Assume that the called party does not answer the call from the calling party. After a predetermined number of rings without an answer, a CO in network 140 may forward the call to a VM device, such as VM device 180 (act 420). Prior to forwarding the call to a VM device, the CO in network 140 may be provided with a telephone number to which the call is to be forwarded after the predetermined number of rings. For example, an entity associated with the services provided by VM devices 170 and 180 may provide the local exchange carrier (LEC) operating the CO in network 140 to which user device 120 is coupled with a toll free number (e.g., an '800' number corresponding to a bridging switch associated with one of VM devices 170/180). The LEC may then configure the CO to forward calls to that toll free number after a predetermined number of rings without an answer at user device 120.

The entity associated with VM devices 170 and 180 may assign the toll free numbers to subscriber loops in a round-robin fashion to increase the likelihood that the overall voice messaging traffic in system 100 will be distributed relatively evenly among VM devices 170 and 180. Alternatively, the assignment of telephone numbers may be based on the geographic location of the subscribers.

In an exemplary implementation, the LEC that forwards the call to the appropriate VM device may be unaffiliated with the entity that operates the voicemail system. That is, VM devices 170 and 180 may be operated by an entity that provides voicemail services to the subscriber at user device 120, but does not provide local phone service to that subscriber. In some implementations, VM devices 170 and 180 may be operated by an interexchange carrier (IEC) that owns facilities or provides long distance services via network 150. In this case, the cost of routing the call through a long distance network (e.g., network 150) may be of little consequence or may be recovered by revenues associated with providing the voice messaging service.

In this example, assume that VM device 180 receives the forwarded call from the LEC. VM device 180 may search database 300 to determine if the subscriber ID corresponding to the called telephone number is stored in database 300 (act 430). If the subscriber ID is not located in database 300, this may indicate that the called party is no longer a subscriber to voicemail services and no voicemail option may be provided (act 440).

If VM device 180 determines that the subscriber ID corresponds to an entry in field 310 of database 300, this indicates that the called party is a voicemail services subscriber. In alternative implementations, database 300 may indicate that VM 170 is the appropriate VM device for the subscriber at user device 120. This may indicate that the subscriber has moved to a different geographical location, such as to another local area transport area (LATA), moved to an area served by a different CO, changed LECs for providing telephone service, etc. In this case, VM 180 may forward the call to VM 170.

Assume that the subscriber ID associated with user device 120 is stored in database 300 associated with VM device 180. In this case, VM device 180 plays a pre-recorded message for the calling party and prompts the calling party to leave a message (act 450). The calling party may then leave a voicemail message and VM 180 may store the voicemail message (act 460).

In this manner, the entity providing voicemail services to a subscriber may be independent of the LEC that provides local phone service to the subscriber. When a subscriber of voicemail services moves or changes LECs, the voicemail service provider merely provides the new LEC servicing the subscriber with the appropriate toll free number to which calls will be forwarded. This enables subscribers to maintain their voicemail services even when moving, changing LECs, etc.

After the calling party has left a voicemail message in the appropriate location (e.g., in VM device 180 in the example above), the voicemail service provider may provide a message waiting indicator (MWI) to the subscriber, as described in more detail below. The MWI may alert the subscriber that one or more messages are stored in VM device 180.

In an exemplary implementation, the MWI may be provided using a Simple Message Desk Interface (SMDI) server/platform that is available from an incumbent LEC. In essence, the SMDI server/platform allows a voicemail service to communicate with a central office and identify certain subscriber loops that are to be provided with a predetermined MWI, such as a "stutter" dial tone or another indication, that indicates that a message is waiting to be retrieved.

Figure 5:
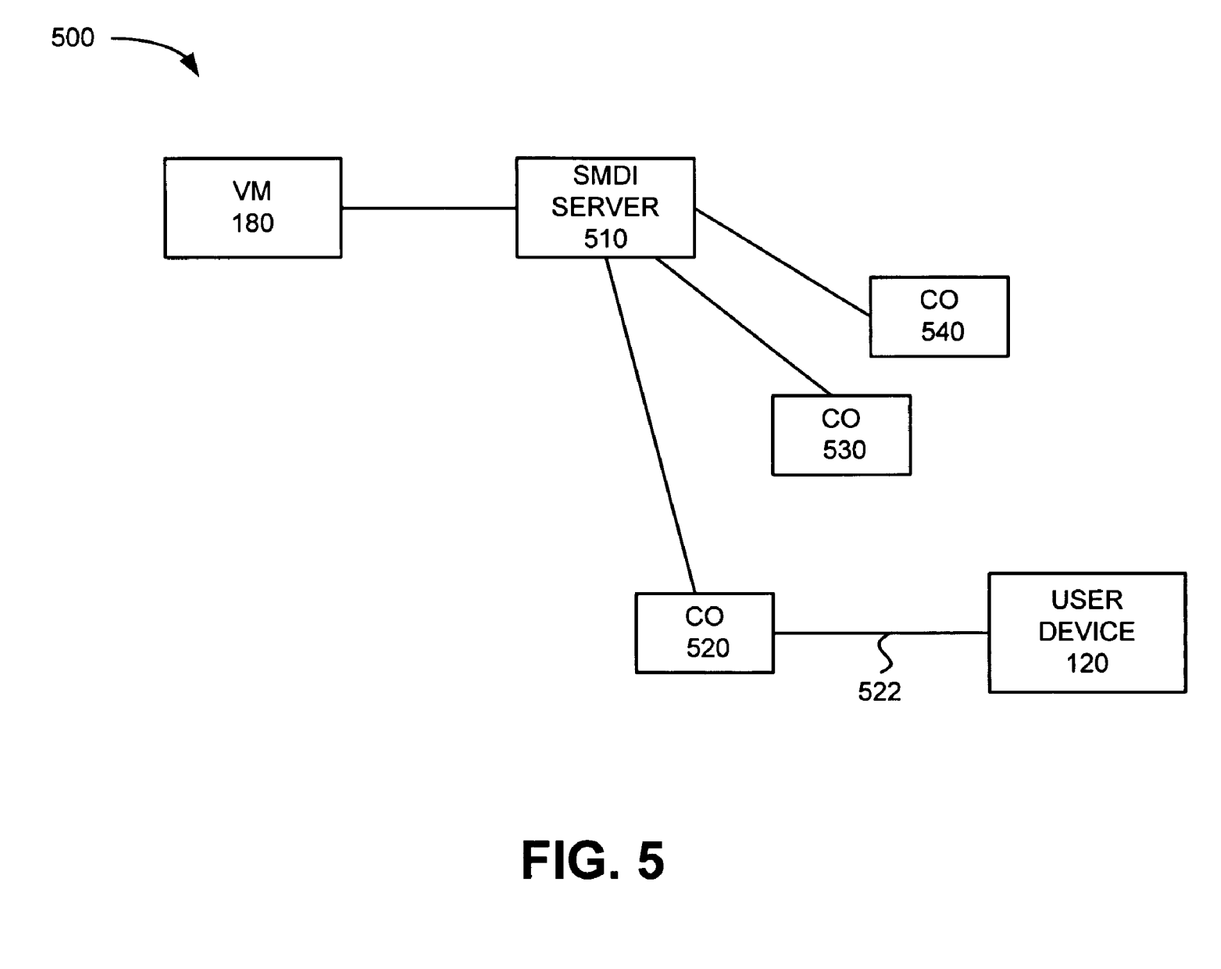
FIG. 5 illustrates a portion of the system of FIG. 1 associated with providing a message waiting indicator to a subscriber in an implementation consistent with the invention.

For example, FIG. 5 illustrates a portion of system 100 associated with providing an MWI to a subscriber. Referring to FIG. 5, system 500 includes VM device 180, SMDI server 510, COs 520, 530 and 540, subscriber loop 522 and user device 120. SMDI server 510 may be a server/platform that provides an interface between a voicemail device, such as VM device 180, and a CO, such as CO 520, as described in more detail below.

COs 520, 530 and 540 may represent conventional central offices involved in routing calls via a network, such as network 140 (FIG. 1). In an exemplary implementation, COs 520–540 may be located in a single LATA. In alternative implementations, COs 520–540 may be located in different LATAs. Subscriber loop 522 represents a connection, such as a conventional twisted pair connection, between user device 120 and CO 520.

Figure 6:
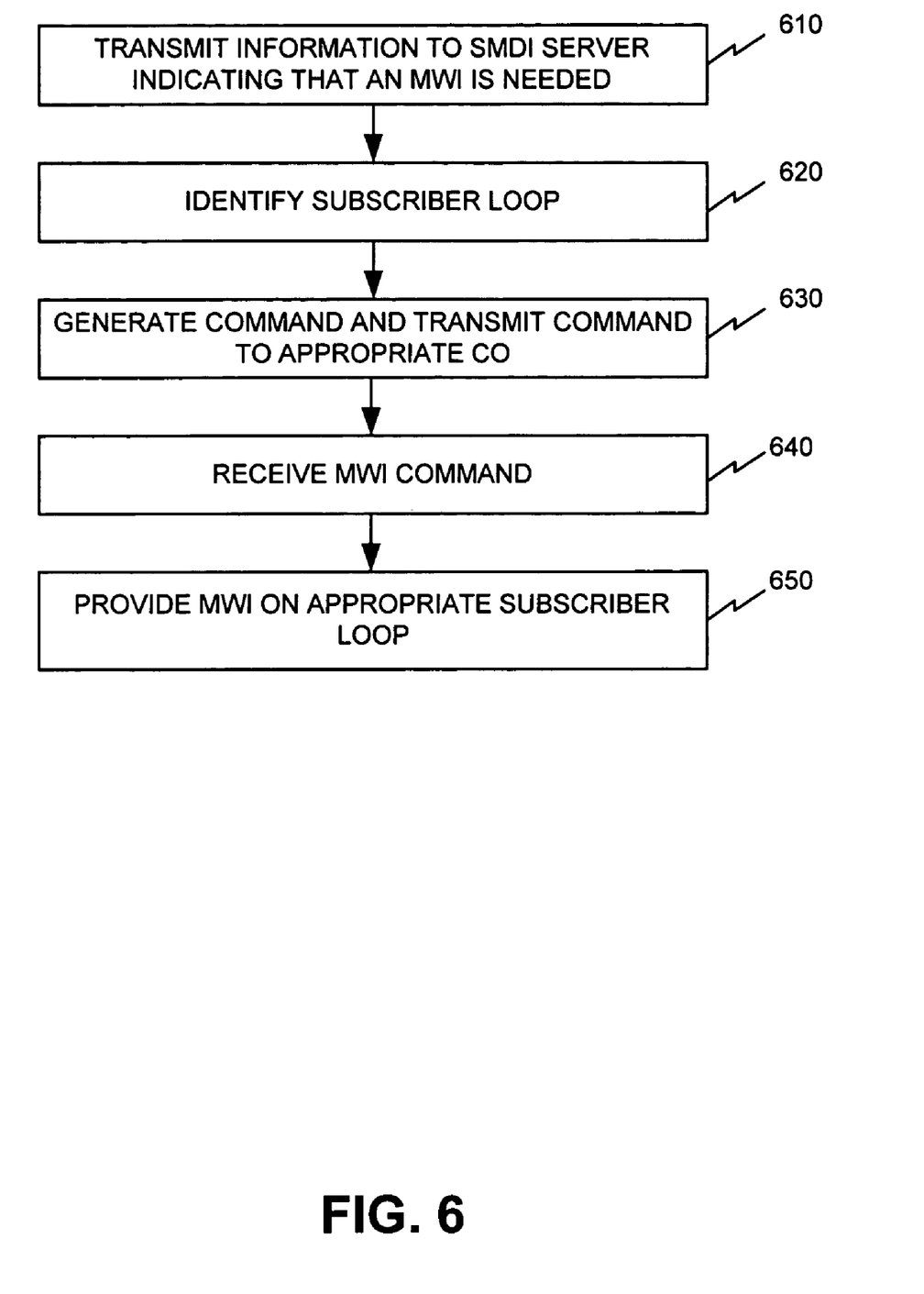
FIG. 6 illustrates an exemplary process associated with providing a message waiting indicator to a subscriber in the system of FIG. 5 in an implementation consistent with the invention.

FIG. 6 illustrates an exemplary process associated with providing an MWI to a subscriber in system 500. Processing may begin after the calling party has left a message for the called party (i.e., subscriber) at user device 120. In this case, VM device 180 may transmit information to SMDI server 510 indicating that an MWI is needed for the subscriber at user device 120 (act 610).

SMDI server 510 may receive the information from VM device 180 and identify the particular subscriber loop associated with the subscriber at user device 120 (i.e., subscriber loop 522 in this example) (act 620). SMDI server 510, consistent with the invention, may access a database to determine the particular subscriber loop associated with the subscriber.

SMDI server 510 may then generate a command indicating that an MWI is needed for subscriber loop 522 and transmit the command to the CO associated with user device 120 (i.e., CO 520 in this example) (act 630). SMDI server 510 may also access a database to determine the appropriate CO and data connection on which to transmit the command.

CO 520 receives the command indicating that an MWI is needed for subscriber loop 522 (act 640). CO 520 then provides an MWI on subscriber loop 522 (act 650). The MWI may include a "stutter tone" provided on subscriber loop 522. That is, when the subscriber takes user device 120 off-hook, a stutter dial tone may be provided for a predetermined period (e.g., one to three seconds) prior to the normal dial tone. This stutter tone indicates that a message is waiting on the subscriber's VM device. Alternatively (or in addition to the stutter tone), the MWI may include a visual indication provided at user device 120, such as a flashing light provided on user device 120. This type of MWI may be used in situations in which user device 120 is not a POTS device. For example, user device 120, as discussed above, may be a wireless device or a SIP telephone. In these cases, the stutter tone may not be available as an MWI and a flashing light or some other indication may be used. In each case, the subscriber at user device 120 is provided with an appropriate MWI so that the subscriber is alerted that a message is waiting.

Figure 7:
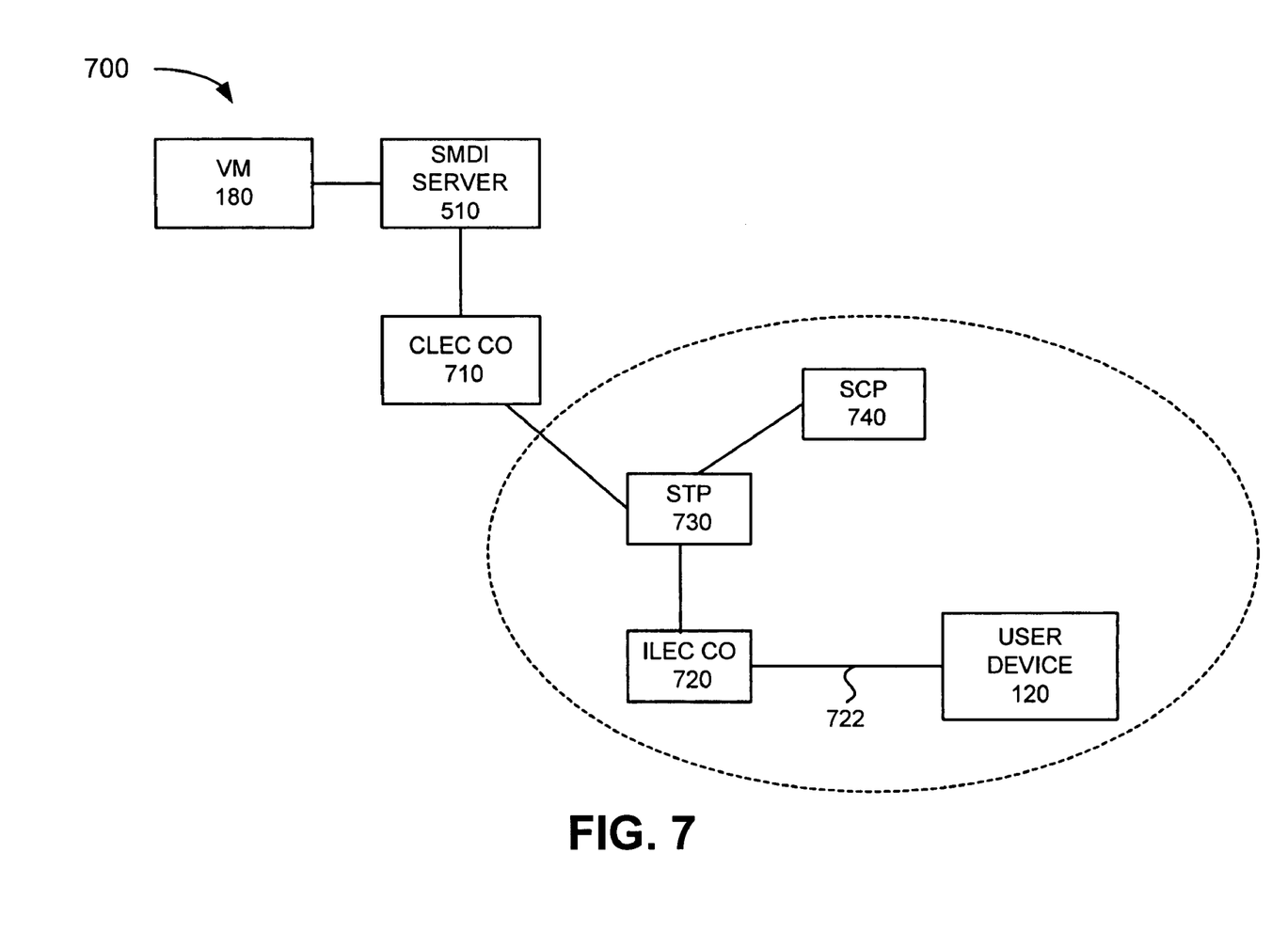
FIG. 7 illustrates a portion of the system of FIG. 1 associated with providing a message waiting indicator to a subscriber in the system of FIG. 5 in an alternative implementation consistent with the invention.

An MWI may be provided to a subscriber using other techniques. For example, FIG. 7 illustrates a portion of system 100 associated with providing an MWI to a subscriber in an alternative implementation. Referring to FIG. 7, system 700 includes VM device 180, SMDI server 510, competitive local exchange carrier (CLEC) CO 710, incumbent local exchange carrier (ILEC) CO 720, signaling transfer point (STP) 730, service control point (SCP) 740, subscriber loop 722 and user device 120.

The portions of system 700 included in the dashed oval in FIG. 7 excluding user device 120 (i.e., ILEC CO 720, STP 730, SCP 740 and subscriber loop 722) may represent portions of system 700 owned and/or operated by an ILEC that has traditionally provided local telephone service in a particular geographical area. CLEC CO 710 may represent a CO that is operated by an entity that is not affiliated with the ILEC and does not own subscriber loop 722. In this case, CLEC CO 710 may lease or pay fees to the ILEC when providing service to user device 120. CLEC CO 710, however, may be affiliated with the voicemail services provider.

ILEC CO 720 may represent a CO associated with the ILEC and may connect to user device 120 via subscriber loop 722. Subscriber loop 722 represents a connection, such as a conventional twisted pair connection, between user device 120 and ILEC CO 720. STP 730 may represent a conventional STP associated with the ILEC and SCP 740 may represent a conventional SCP associated with the ILEC. ILEC CO 720 may interact with STP 730 and SCP 740 to facilitate communications to/from user device 120.

Figure 8:
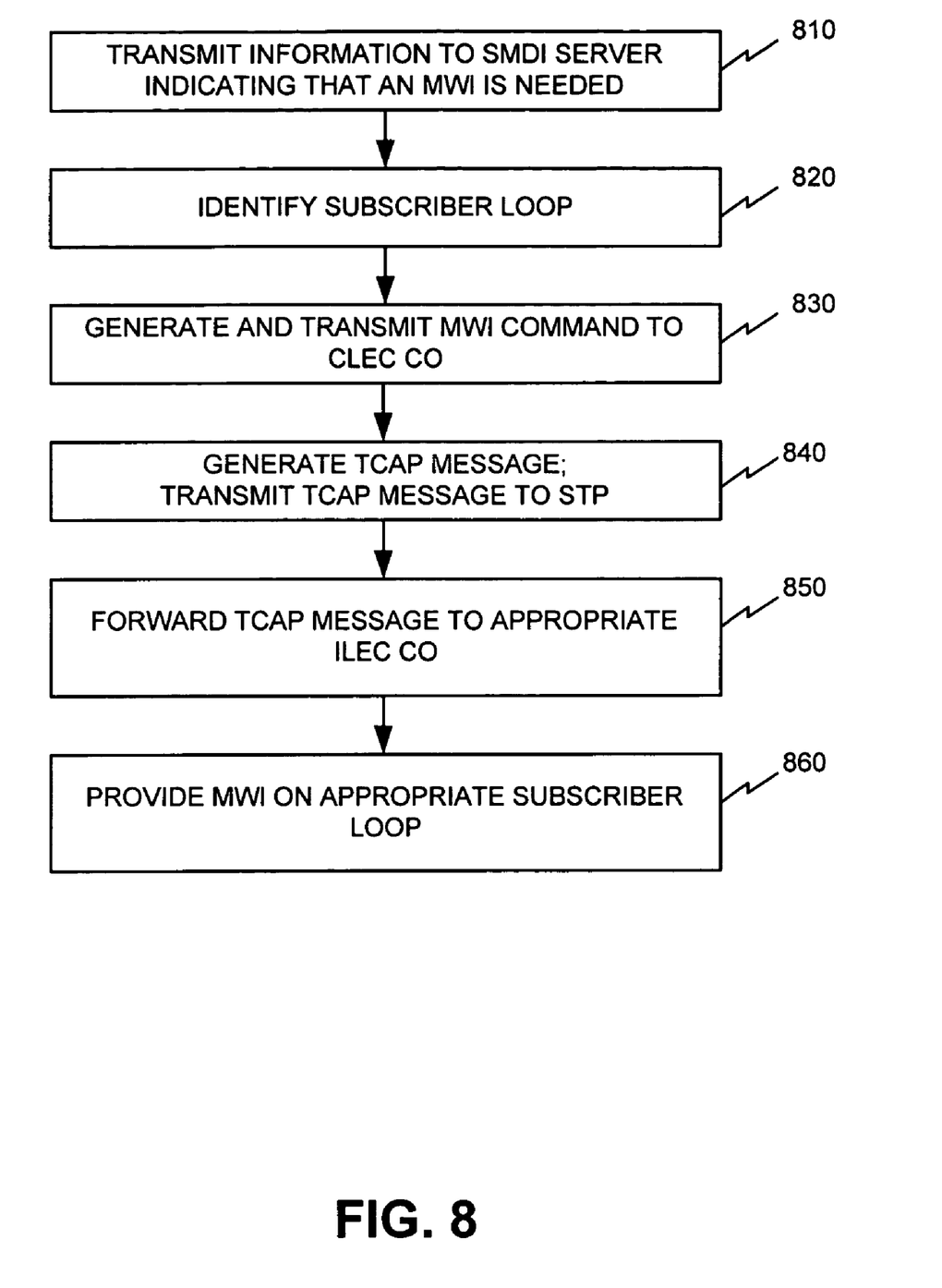
FIG. 8 illustrates an exemplary process associated with providing a message waiting indicator to a subscriber in the system of FIG. 7 in an implementation consistent with the invention.

FIG. 8 illustrates an exemplary process associated with providing an MWI to a subscriber in system 700. Processing may begin after the calling party has left a message for the called party (i.e., subscriber) associated with user device 120. In this case, VM device 180 may transmit information to SMDI server 510 indicating that an MWI is needed for a particular subscriber (act 810).

SMDI server 510 may receive the information from VM device 180 and identify the particular subscriber loop associated with the subscriber at user device 120 (i.e., subscriber loop 722 in this example) (act 820). SMDI server 510, consistent with the invention, may access a database to determine the particular subscriber loop associated with the subscriber.

SMDI server 510 may then generate a command indicating that an MWI is needed for subscriber loop 722 (act 830). SMDI server 510 may also access a database to determine the appropriate CO (CLEC CO 710 in this example) to which to transmit the command. SMDI server 510 may then transmit the command to CLEC CO 710 (act 830).

CLEC CO 710 receives the command indicating that an MWI is needed for the subscriber loop associated with user device 120 (i.e., subscriber loop 722) and generates a command for transmission to the ILEC associated with subscriber loop 722 indicating that an MWI is needed (act 840). In an exemplary implementation, the command generated by CLEC CO 710 may be a Signaling System 7 (SS7)-compliant transaction capabilities application part (TCAP) message for transmission to an STP, such as STP 730. The TCAP message may include a Global Translation Type field. The Global Translation Type field may be set to a value (e.g., '7') that indicates that the TCAP message pertains to providing an MWI. The TCAP message may also include an address corresponding to user device 120. CLEC CO 710 may then transmit the TCAP message to STP 730 (act 840).

STP 730 receives the TCAP message and may identify the address (e.g., the subscriber's telephone number) included in the TCAP message. STP 730 may also determine a destination point code corresponding to the CO that serves the particular subscriber (i.e., ILEC CO 720 in this example). STP 730 may access SCP 740 to determine the destination point code corresponding to the CO that serves the particular subscriber loop. STP 730 may then forward the TCAP message to ILEC CO 720 (act 850).

ILEC CO 720 receives the TCAP message indicating that an MWI indicator is need for subscriber loop 722. ILEC CO 720 then provides an MWI indicator on subscriber loop 722 (act 860). Similar to the discussion above with respect to FIG. 6, the MWI may include one or more of a stutter tone, a visual indication and some other indication.

In this manner, a CLEC providing a voice messaging service to a subscriber may not need to keep track of particular destination point codes within the ILEC network in order to provide an MWI. In addition, the CLEC may forward an MWI command using SS7-compliant TCAP messages and does not need to maintain separate data connections to each ILEC CO.

In each of the above scenarios, the subscriber may receive the MWI indicating that a call is waiting. The subscriber may then dial a phone number or enter a pre-designated group of characters to retrieve the voicemail messages. In one implementation, the phone number may be an "800" number. Alternatively, the subscriber may an Internet address associated with VM device 180.

After accessing the VM device (i.e., VM device 180 in this example), VM device 180 may request an authorization code for accessing the stored voicemail messages associated with calls to user device 120. In an alternative implementation consistent with the invention, VM device 180 may capture the telephone number associated with the subscriber's user device 120 without requesting an authorization code. For example, automatic number identification (ANI) techniques may be used to capture the telephone number associated with the subscriber's user device 120. In this implementation, no additional authorization code may be needed and the subscriber may be provided immediate access to his/her voicemail account after accessing the VM device.

CONCLUSION

Implementations consistent with the invention provide a portable voicemail service that is independent of the local service provider. This allows a subscriber to change LECs, move to an area serviced by a different LEC, etc., without having to change voicemail service providers.

The foregoing description of exemplary implementations of the invention provides illustration and description, but is not intended to be exhaustive or to limit the invention to the precise form disclosed. Modifications and variations are possible in light of the above teachings or may be acquired from practice of the invention. For example, in an exemplary implementation described above, the telephone call may be forwarded by an LEC over a long distance network using a toll free number provided by the voicemail services provider. In other implementations, the phone calls may be forwarded by the LEC to a local telephone number associated with a VM device.

In addition, while series of acts have been described with respect to FIGS. 4, 6 and 8, the order of the acts may be varied in other implementations consistent with the invention. Further, acts being described as being performed by one device above may be performed by other devices in implementations consistent with the invention. Moreover, non-dependent acts may be implemented in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code, it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method for providing voicemail services, comprising:

receiving, by a voicemail system, a call forwarded from a first local exchange carrier associated with a called party via a long distance network, the call being from a calling party and intended for the called party and wherein the voicemail system is not affiliated with the first local exchange carrier;

providing a prompt to the calling party;

storing a voicemail message from the calling party;

identifying a subscriber loop associated with the called party;

identifying a central office associated with the subscriber loop; and transmitting a message to the central office associated with the subscriber loop, the message indicating that a message waiting indicator is to be provided to the called party, wherein the voicemail system comprises a plurality of network devices configured to receive voicemail messages, the method further comprising:

providing the first local exchange carrier with a plurality of toll free telephone numbers to which calls to subscribers of the voicemail system are to be forwarded after a predetermined number of rings, the providing comprising:

assigning the toll free numbers to subscriber loops in a round robin fashion such that calls to the subscribers of the voicemail system are distributed over the plurality of network devices.

2. The method of claim 1, wherein the message comprises a transaction capabilities application part (TCAP) message.

3. The method of claim 1, wherein the voicemail system is operated by a long distance service provider.

4. The method of claim 1, wherein the voicemail system is operated by a competitive local exchange carrier.

5. The method of claim 1, further comprising:

receiving a plurality of calls forwarded from a plurality of local exchange carriers;

receiving a plurality of voicemail messages associated with the plurality of calls;

storing the plurality of voicemail messages for retrieval by a plurality of subscribers; and transmitting messages to the plurality of local exchange carriers, the messages indicating that message waiting indicators are to be provided to the plurality of subscribers.

6. A system, comprising:

a plurality of network devices, each of the network devices being configured to:

receive calls forwarded from one of a plurality of local exchange carriers via a long distance network, provide a message to calling parties instructing each of the calling parties to leave a voice message, receive voice messages from the calling parties, and store the voice messages, wherein the plurality of network devices are affiliated with a long distance service provider or a competitive local exchange provider; and a server configured to:

assign a plurality of toll free numbers to subscriber loops of the plurality of local exchange carriers in a round robin fashion to distribute voice messaging traffic among the plurality of network devices.

7. The system of claim 6, wherein the plurality of network devices are operated by a long distance service provider.

8. The system of claim 6, wherein the plurality of network devices are operated by a competitive local exchange provider.

9. The system of claim 6, wherein the server is further configured to:

provide a first local exchange carrier with a plurality of toll free numbers, each of the plurality of toll free numbers being associated with one of a plurality of subscribers connected to a subscriber loop and corresponding to one of the plurality of network devices.

10. The system of claim 9, wherein the server is configured to:

assign the plurality of toll free numbers to the local exchange carriers so that each of the plurality of network devices receives approximately a same number of forwarded calls.

11. The system of claim 6, wherein each of the plurality of network devices is configured to:

transmit information to the server indicating that a message waiting indicator is to be provided to each of a plurality of called parties for which a voice message has been stored.

12. The system of claim 11, wherein the server is further configured to:
receive the information from a first one of the network devices, and
transmit commands to the plurality of local exchange carriers indicating that a message waiting indicator is to be provided to each of the plurality of called parties.

13. The system of claim 12, wherein the server is further configured to:
identify a central office associated with a first local exchange carrier to which a first one of the commands is to be transmitted, and when transmitting the first command, the server is configured to:
transmit the first command to the central office associated with the first local exchange carrier.

14. The system of claim 11, further comprising:
a central office; and
wherein the server is configured to:
transmit message waiting indicator information to the central office indicating that the message waiting indicator is to be provided to each of the plurality of called parties, and the central office is configured to:
receive the message waiting indicator information from the server, and
transmit a request to a first local exchange carrier in response to the received message waiting indicator information.

15. The system of claim 14, wherein when transmitting the request, the central office is configured to:
transmit a transaction capabilities application part (TCAP) message.

16. The system of claim 6, wherein each of the plurality of network devices is configured to receive calls forwarded from the plurality of local exchange carriers.

17. A system, comprising:
means for receiving a call from a calling party and intended for a called party, the call being forwarded from a local service provider not associated with the system;
means for prompting the calling party to leave a message;
means for receiving a message from the calling party;
means for storing the message;
means for providing a plurality of toll free numbers to a plurality of local service providers, each of the plurality of toll free numbers being associated with a plurality of parties subscribing to a voicemail service;
means for assigning the plurality of toll free numbers to subscriber loops in a round robin fashion such that calls to parties subscribing to the voicemail service are evenly distributed over a plurality of means for receiving calls;
means for identifying a central office associated with a local service provider providing telephone service for the called party; and
means for informing the local service provider that a message waiting indicator is to be provided to the called party.

18. A system, comprising:
at least one network device configured to:
receive voicemail messages intended for subscribers, wherein the subscribers are associated with a plurality of different local telephone service providers, and
store the voicemail messages; and
a processing device configured to:
provide the plurality of different local telephone service providers with a plurality of telephone numbers to which calls to the subscribers are to be forwarded after a predetermined number of rings, wherein each of the plurality of telephone numbers is assigned to a plurality of subscriber loops and each of the subscriber loops is associated with a plurality of the subscribers.

19. The system of claim 18, wherein the at least one network device is associated with at least one of a long distance service provider or a competitive local exchange carrier.

20. The system of claim 18, wherein the plurality of telephone numbers comprise toll free numbers.

21. The system of claim 18, further comprising:
a server coupled to the at least one network device, wherein the server is configured to:
request that a first one of the plurality of different local telephone service providers associated with a first subscriber provide a message waiting indicator to the first subscriber based upon a received voicemail message intended for the first subscriber.

22. The system of claim 18, wherein each of the plurality of different local telephone service providers provide local telephone service to at least one of the subscribers.

* * * * *